United States Patent
Kwon et al.

(10) Patent No.: US 9,849,865 B2
(45) Date of Patent: Dec. 26, 2017

(54) EMERGENCY BRAKING SYSTEM AND METHOD OF CONTROLLING THE SAME

(71) Applicant: Hyundai Motor Company, Seoul (KR)

(72) Inventors: Ji Won Kwon, Gyeonggi-do (KR); Hai Jin Seo, Gyeonggi-do (KR); Don Hyoung Lee, Gyeonggi-do (KR); Gi Won Park, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/196,754

(22) Filed: Jun. 29, 2016

(65) Prior Publication Data

US 2017/0166172 A1  Jun. 15, 2017

(30) Foreign Application Priority Data

Dec. 15, 2015 (KR) .......................... 10-2015-0178997

(51) Int. Cl.
*B60T 7/22* (2006.01)
*B60T 8/171* (2006.01)

(52) U.S. Cl.
CPC ................ *B60T 7/22* (2013.01); *B60T 8/171* (2013.01); *B60T 2201/022* (2013.01); *B60T 2210/32* (2013.01)

(58) Field of Classification Search
CPC ....... B60T 7/22; B60T 8/171; B60T 2201/022
USPC .......................................................... 701/70
See application file for complete search history.

(56) References Cited

U.S. PATENT DOCUMENTS

| 6,084,508 A * | 7/2000 | Mai ............................ B60T 7/22 340/435 |
| 9,630,619 B1 * | 4/2017 | Kentley ................ B60W 30/09 |
| 2004/0193374 A1 * | 9/2004 | Hac .................... B60K 31/0008 701/301 |
| 2011/0015818 A1 * | 1/2011 | Breuer ................ B60T 8/17558 701/31.4 |
| 2015/0210256 A1 * | 7/2015 | Yamashita ................ B60T 7/22 303/14 |
| 2015/0336547 A1 * | 11/2015 | Dagan ....................... B60T 7/22 701/70 |

(Continued)

FOREIGN PATENT DOCUMENTS

| JP | 2002-220035 A | 6/2002 |
| JP | 2007-008327 A | 1/2007 |

(Continued)

*Primary Examiner* — Atul Trivedi
(74) *Attorney, Agent, or Firm* — Mintz Levin Cohn Ferris Glovsky and Popeo, P.C.

(57) ABSTRACT

An emergency braking system is provided and brakes a vehicle by more efficiently predicting forward collision. The emergency braking system includes an imaging device that identifies a forward obstacle and a sensor that senses an external environment and a driving state of a vehicle. A controller determines a road on which the vehicle is driven, determines a current driving environment case among a plurality of driving environment cases, using external environment information and road information and learns a driving pattern for the current driving environment case, using obstacle information and driving state information. Additionally, the controller variably adjusts warning and braking intervention timings using the learned driving pattern according to the driving environment cases.

20 Claims, 5 Drawing Sheets

(56) References Cited

U.S. PATENT DOCUMENTS

| | | | |
|---|---|---|---|
| 2016/0016561 A1* | 1/2016 | Lee | B60T 7/22 |
| | | | 701/70 |
| 2016/0144840 A1* | 5/2016 | Pfeifer | B60T 7/042 |
| | | | 701/76 |
| 2017/0120904 A1* | 5/2017 | Kentley | B60W 30/09 |
| 2017/0203744 A1* | 7/2017 | Dagan | B60T 17/221 |

FOREIGN PATENT DOCUMENTS

| | | |
|---|---|---|
| JP | 2007-246024 A | 9/2007 |
| JP | 2010-117839 A | 5/2010 |
| JP | 2013-002850 A | 1/2013 |
| KR | 10-2002-0034767 A | 5/2002 |
| KR | 2014-0034492 A | 3/2014 |
| KR | 2015-0051548 A | 5/2015 |
| KR | 10-1521118 B1 | 6/2015 |

\* cited by examiner

EMERGENCY BRAKING SYSTEM AND METHOD OF CONTROLLING THE SAME

CROSS REFERENCE TO RELATED APPLICATION(S)

This application claims the benefit of Korean Patent Application No. 10-2015-0178997, filed on Dec. 15, 2015, which is hereby incorporated by reference as if fully set forth herein.

BACKGROUND

Field of the Invention

The present invention relates to an emergency braking system capable of braking a vehicle by more efficiently predicting forward collision and a method of controlling the same.

Discussion of the Related Art

Recently, with advances in sensor technology and control technology, functions for assisting a driver have been included in a vehicle. One of the functions is advanced emergency braking (AEB) that generates a warning or performs braking when there is a possibility of collision with a forward obstacle.

A normal emergency braking system calculates an expected collision time using target information regarding preceding vehicles and pedestrians, obtained from a forward radar and an imaging device, and generates a warning sound and performs braking control, such as partial braking and engine torque reduction, and full braking, based on a classified danger level. A danger level may be divided into a plurality of detailed levels based on characteristics of the system and may be divided by a lookup table value prestored in the system based on an expected collision time and relative speed with a target obstacle.

For example, a relationship between operation, speed, and an expected collision time when a danger level is divided into three levels will now be described with reference to FIGS. 1A and 1B of the related art. FIGS. 1A and 1B illustrate classification of a danger level and an operation performed according to the danger level in a normal emergency braking system of the related art.

Referring to FIG. 1A, when the danger level is classified into first warning, second warning, and third warning, different actions such as warning sound generation, partial braking, and full braking may be performed based on the respective danger levels and deceleration and acceleration are substantially affected by each danger level.

In addition, as illustrated in FIG. 1B, a timing at which an operation corresponding to each danger level is performed may be determined based on relative speed and an expected collision time between a current vehicle and a forward obstacle. For example, when the relative speed is high or greater than a particular speed, warning or braking may be performed even when substantial time remains until the expected collision time and, when the relative speed is low or less than a particular speed, warning or braking may be performed when relatively less time is left unit the expected collision time.

As described above with reference to FIG. 1, warning and braking timings in the normal emergency braking system are predetermined and only a variable offset may be applied to the warning timing and the braking timing based on input of a system setup command by a driver. Therefore, when warning is generated in a situation where the driver determines that a current state is not dangerous or when braking is performed in a situation where the driver is capable of sufficiently avoiding a current situation or performing braking, driver inconvenience may occur.

SUMMARY

Accordingly, the present invention provides an emergency braking system for efficiently performing braking and a method of controlling the same that substantially obviate one or more problems due to limitations and disadvantages of the related art. An object of the present invention is to provide an emergency braking system capable of determining a braking intervention timing based on a driver tendency and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an emergency braking system of a vehicle may include an imaging device configured to identify a forward obstacle, a sensor configured to sense an external environment and a driving state of a vehicle, and a controller configured to determine a road on which the vehicle drives, determine a current driving environment case among a plurality of driving environment cases, using external environment information received from the sensor and road information and to learn a driving pattern for the current driving environment case, using obstacle information received from the imaging device and driving state information received from the sensor, and variably adjust warning and braking intervention timings using the learned driving pattern according to the driving environment cases.

In another aspect of the present invention, a method of controlling an emergency braking system of a vehicle may include receiving external environment information and road information, determining a current driving environment case among a plurality of driving environment cases, using the external environment information and the road information, receiving forward obstacle information and driving state information, learning a driving pattern for the current driving environment case, using the received forward obstacle information and driving state information, and variably adjusting warning and braking intervention timings using the learned driving pattern according to the driving environment cases.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplar embodiment(s) of the invention and together with the description serve to explain the principle of the invention. In the drawings.

DETAILED DESCRIPTION

Figure 1A:
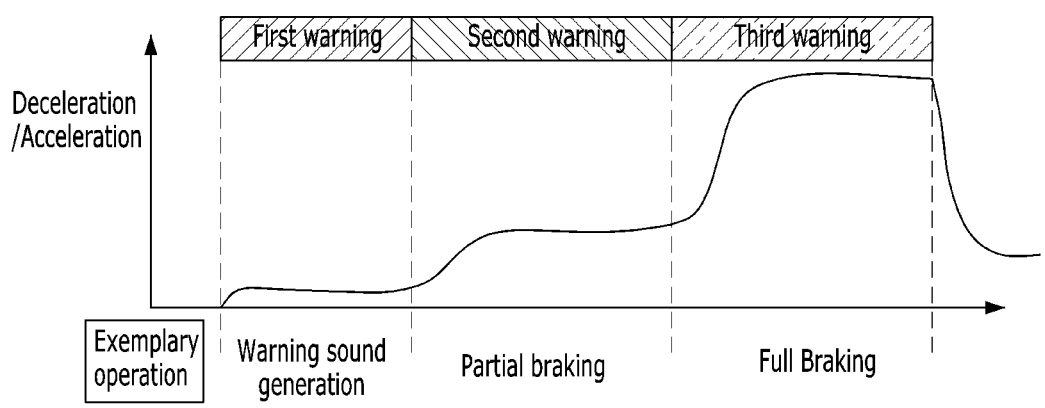
FIGS. 1A and 1B illustrate classification of a danger level and an operation performed according to the danger level in a normal emergency braking system according to the related art.
Figure 1B:
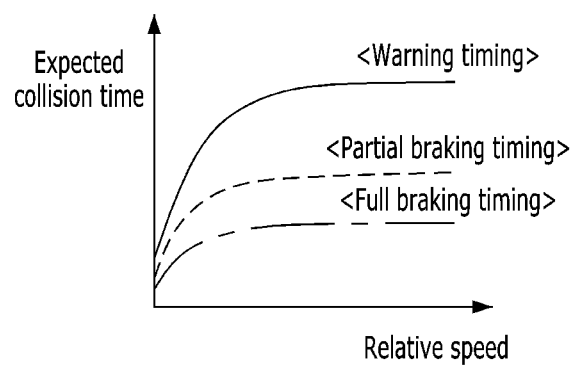

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" used in the description below are given or used together only in consideration of ease in preparation of the specification and do not have distinctive meanings or functions.

In addition, in the following description of the embodiments disclosed herein, a detailed description of related known technologies will be omitted when it may make the subject matter of the exemplary embodiments disclosed herein rather unclear. In addition, the accompanying drawings have been made only for a better understanding of the exemplary embodiments disclosed herein and are not intended to limit technical ideas disclosed herein, and it should be understood that the accompanying drawings are intended to encompass all modifications, equivalents and substitutions within the sprit and scope of the present invention.

An exemplary embodiment of the present invention provides an emergency braking system for classifying a driving environment, learning a braking tendency of a driver based on classified driving environments, and performing a braking operation according to the braking tendency of the driver. According to an aspect of the present exemplary embodiment, a driving environment may include an external environmental factor such as weather or time zone/external brightness and type or class of road. In particular, roads may be divided into country roads, freeways, collectors, and the like and may be divided into road classes which are a criterion for dividing road in a navigation device. The road classes are as follow.

Road class 0: Freeways
Road class 1: Arterials
Road class 2: Country roads
Road class 3: Collectors
Road class 4: Local/unpaved local roads According to an aspect of the present exemplary embodiment, the time zone may use a global positioning system (GPS) time of the navigation device or may be distinguished by external brightness obtained using an illumination sensor. In addition, rain may be sensed by a rain sensor of a rain sensing wiper system. Additionally, a braking habit of a driver may include a distance between a braking start point and a braking end point according to braking manipulation, deceleration and acceleration during braking, an acceleration tendency of the driver, and a steering angle (activated during avoidance).

Figure 2:
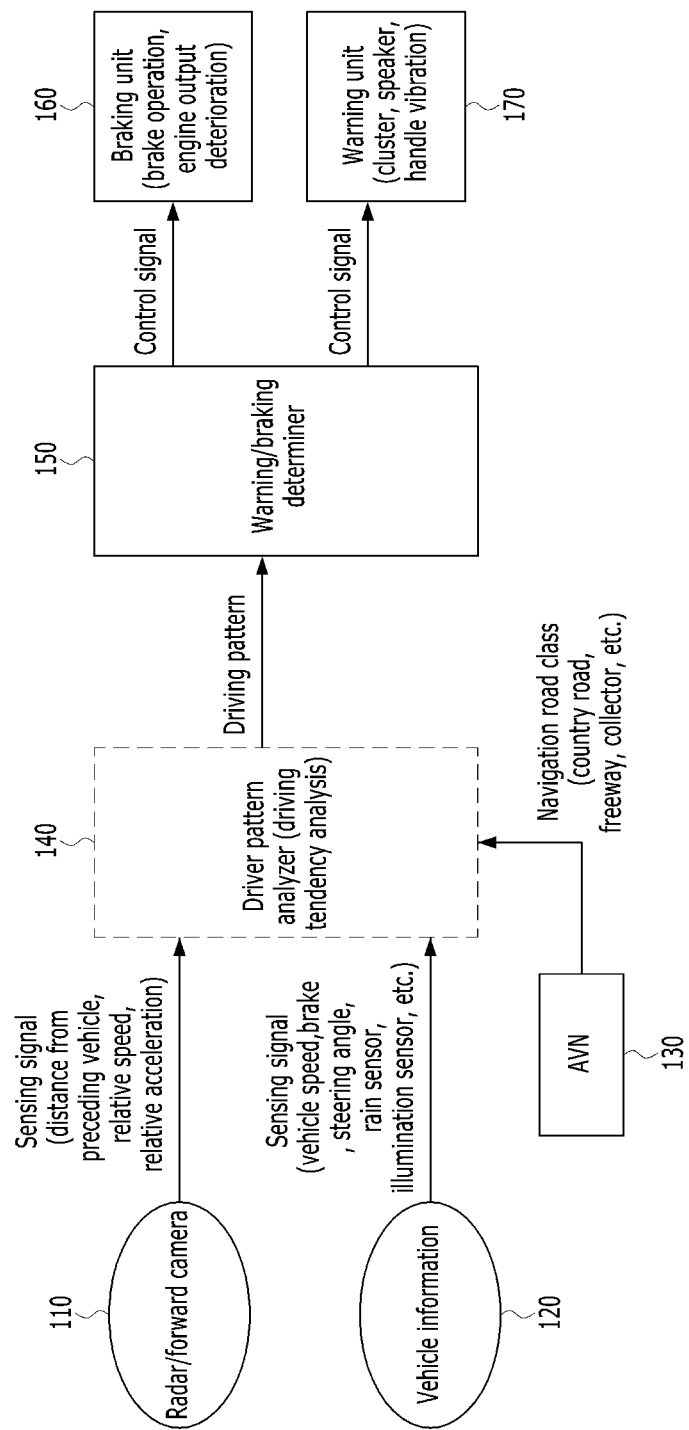
FIG. 2 illustrates the configuration of an emergency braking system according to an exemplary embodiment of the present invention.

A system configuration for performing the above-described exemplary embodiment of the present invention will now be described with reference to FIG. 2. FIG. 2 illustrates the configuration of an emergency braking system according to an exemplary embodiment of the present invention.

Referring to FIG. 2, the emergency braking system according to the present exemplary embodiment may include an identification module 110 (e.g., an imaging device) configured to identify or detect forward obstacles, a vehicle information module 120 including various sensors configured to sense driving state information of a vehicle and external environmental factors, an audio video navigation (AVN) system 130 configured to provide navigation related information, a driver pattern analyzer 140 configured to analyze a driving pattern of a driver, a warning/braking determiner 150 configured to determine whether to perform warning/braking based on the analyzed driving pattern, a braking unit 160 configured to perform braking based on a control signal, and a warning unit 171 configured to generate a warning based on a control signal. The various units as described above of the system may be executed by a controller having a processor and a memory.

In particular, the identification module 110 may be configured to transmit information regarding a distance from an obstacle such as a preceding vehicle, relative speed, and relative acceleration to the driver pattern analyzer 140, using a radar and/or a forward imaging device (e.g., camera, video camera, or the like). The vehicle information module 120 may be configured to transmit driving state information, such as vehicle speed, brake, and a steering angle, and external environmental information, such as a rain sensor sensing value and an illumination sensor sensing value, to the pattern analyzer 140.

The AVN system 130 may be configured to provide class or type information of a road on which the driver is driving and information regarding roads on which the driver frequently drives to the pattern analyzer 140. The driver pattern analyzer 140 may then be configured to perform clustering using a variety information obtained from the above three modules or system components. As a result, when a plurality of driving environment cases occurs, the driver pattern analyzer 140 may be configured to determine a case that corresponds to a current driving environment and apply information regarding a vehicle driving state to each determined case, thereby learning a pattern of a driver. Whether learning is terminated may be determined based on an accumulation time or may be determined based on the number of driving times or a driving distance.

When a driving pattern for each case is learned, the driver pattern analyzer 140 may be configured to update existing pattern information as a learned pattern and transmit the updated pattern information to the warning/braking determiner 150. The driver pattern analyzer 140 may also be configured to transmit information regarding a current driving state to the warning/braking determiner 150.

Further, the warning/braking determiner 150 may be configured to match the pattern information transmitted by the pattern analyzer 140 to a table value referred to during warning/braking control. Then, the warning/braking determiner 150 may be configured to operate the braking unit 160 and the warning unit 170 by referring to the matched table value. In particular, the warning/braking determiner 150 may be configured to receive information regarding a current environment and a vehicle driving state from the pattern analyzer 140 or directly from the identification module 110 and the vehicle information module 120.

The matched table value may be separately prepared with respect to each driving environment case. The braking unit 160 may be configured to operate a brake or lower engine output based on a control signal of the warning/braking determiner 150. The warning unit 170 may then be configured to generate an audiovisual and/or vibration warning through a cluster, a speaker, and/or a handle vibration module based on the control signal of the warning/braking determiner 150.

Figure 3:
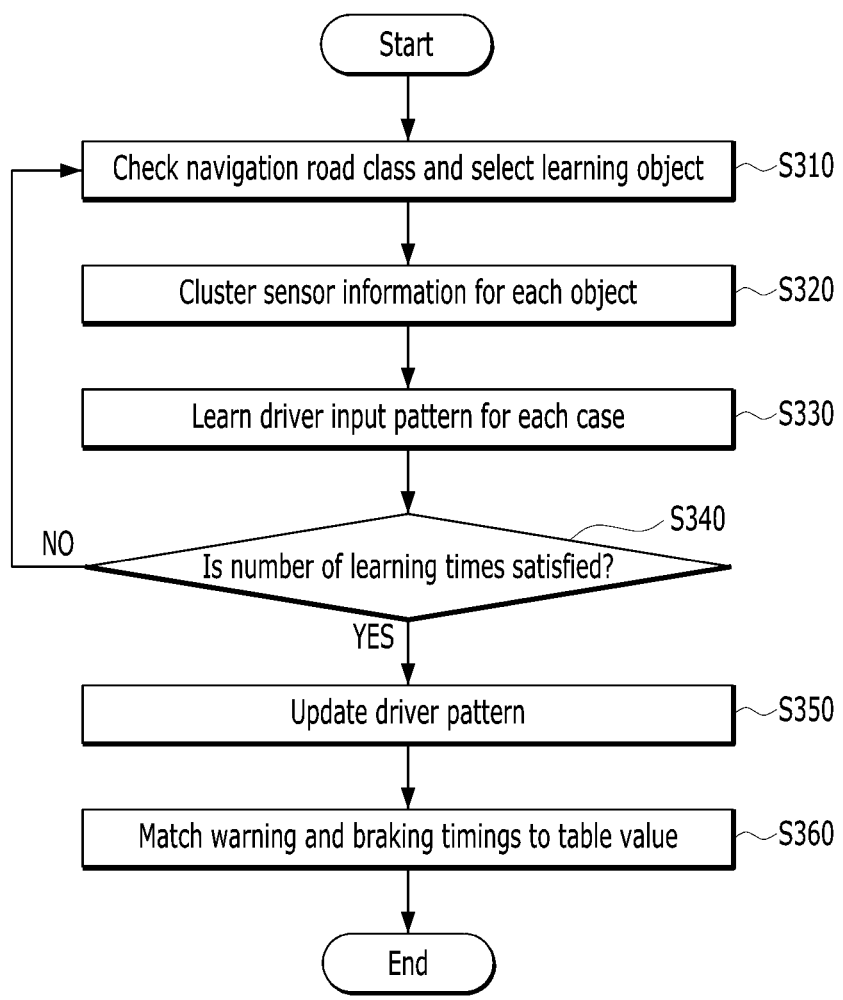
FIG. 3 is a flowchart illustrating a process of analyzing and matching a driver pattern in an emergency braking system according to an exemplary embodiment of the present invention.

Hereinafter, a process of analyzing and matching a driver pattern in the above-described system will be described. FIG. 3 is a flowchart illustrating a process of analyzing and matching a driver pattern in an emergency braking system according to an exemplary embodiment of the present invention. Referring to FIG. 3, the driver pattern analyzer 140 may be configured to detect a road class obtained using the AVN system 130 and select a learning object (S310). The learning object may indicate a learning object zone of a different driving environment such as a country road, a freeway, or a collector on which a driver frequently drives.

Further, the driver pattern analyzer 140 may be configured to collect sensor information input from the identification module 110 and the vehicle information module 120 with respect to each road class and divide and generate cases (S320). More specifically, the collected information may include a distance from a target (e.g., a preceding vehicle), relative speed, and vehicle speed and may further include information regarding an illumination sensor configured to distinguish between night and day (e.g., low light and bright light) and a rain sensor configured to detect a rain condition, for performance improvement.

The reason for generating the cases is that a driving tendency of a driver may differ based on a driving environment of the driver. For example, a distance from a target may be greater than a predetermined distance and vehicle speed may be greater than a predetermined speed on a freeway, whereas a distance from a target may be shorter and vehicle speed is slower on a country road compared to distance and speed on the freeway. In addition, when rain is detected, a driver tends to start braking more rapidly. Obviously, types of sensor information used for learning may differ based on a road class or a case.

As occurrence of cases is terminated, the driver pattern analyzer 140 may be configured to learn a driving pattern of a driver for each case based on driver manipulation (S330). A learning object may include braking start and end points based on engagement and disengagement of a brake pedal (e.g., brake on/off), a braking and acceleration tendency of the driver during a braking situation such as deceleration and acceleration during braking, and a steering angle (avoidance).

When the number of times of learning (e.g., a learning time, and/or a driving distance) satisfies a preset value, the driver pattern analyzer 140 may be configured to determine a driving pattern of the driver and, if not, the driver pattern analyzer 140 may perform previous steps until it is satisfied (S340). In particular, the number of learning times may be variable based on characteristics of sensors and vehicle driving information.

When the learning is terminated, the driver pattern analyzer 140 may be configured to analyze a driver pattern based on sensor information for each case and update the driver pattern (S350). Information regarding the updated driver pattern may be transmitted to the warning/braking determiner 150 and the warning/braking determiner 150 may be configured to match the information regarding the updated driving pattern to a lookup table value to be referred to in determining warning and braking timings (S360) indicating that a timing at which intervention for performing warning and braking is started is variable.

Figure 4:
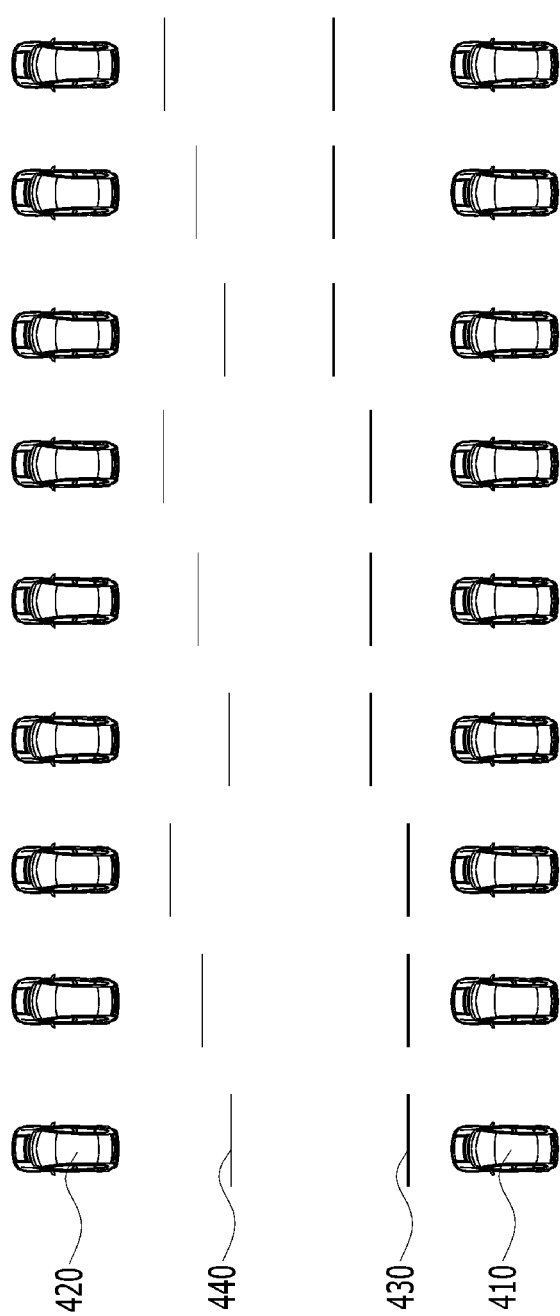
FIG. 4 illustrates an example of determining a warning timing and a braking timing according to a driving pattern of a driver according to an exemplary embodiment of the present invention.

Hereinafter, a scheme of determining warning and braking timings based on a driving pattern will be described in detail with reference to FIG. 4. FIG. 4 illustrates an example of determining a warning timing and a braking timing according to a driving pattern of a driver according to an exemplary embodiment of the present invention.

A vehicle 410 shown at a lower part of FIG. 4 denotes a vehicle including an emergency braking system according to the present exemplary embodiment and a vehicle 420 shown at an upper part of FIG. 4 indicates a target, i.e., a preceding vehicle. A lower line between the two vehicles 410 and 420 represents a point at which a driver manipulates a brake, i.e., a braking start point, and an upper line 440 represents a braking end point (e.g., an engagement point of a brake pedal and a disengagement point of a brake pedal).

Referring to FIG. 4, when braking is started early although a distance from the target is relatively far (i.e., three cases from the left), since this indicates that a driver has a tendency towards starting braking early, a warning timing may be advanced. In addition, when a braking end point is near to the target 440, since this indicates that a driver has a tendency towards ending braking slowly, the braking timing may be set to be slow. A similar principle may be applied to the other cases and thus a repeated description will be omitted for clarity of the disclosure.

Figure 5:
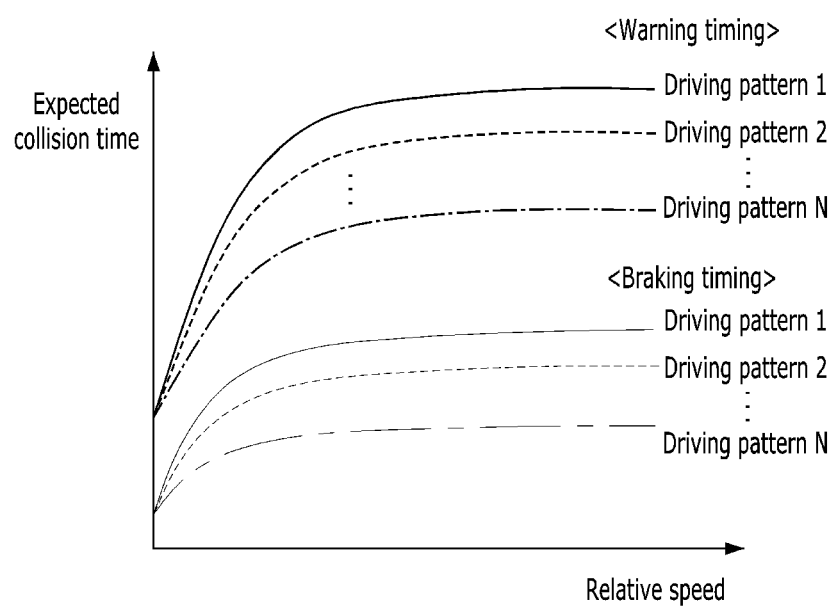
FIG. 5 illustrates an example of variably setting a warning timing and a braking timing according to a driving pattern of a driver according to an exemplary embodiment of the present invention.

Consequently, a warning timing and a braking intervention timing may vary based on a driving environment case (i.e., a driving pattern) and a relationship between relative speed and an expected collision time may be indicated as shown in FIG. 5. Meanwhile, the above-described driver pattern analyzer 140 and the warning/braking determiner 150 in the present invention may be included in the same controller or may be implemented as separate controllers. For example, functions of the driver pattern analyzer 140 and the warning/braking determiner 150 may be included in an advanced driver assistance system (ADAS) controller such as a forward collision warning system (FCWS) controller or an autonomous emergency braking (AEB) controller.

According to at least one exemplary embodiment of the present invention, the following effects are obtained. A more efficient emergency braking system may be provided. In particular, since a braking manipulation tendency of a driver with respect to each road or each situation may be learned, sense of difference felt by the driver due to intervention of a system may be reduced. The effects that may be achieved through the present invention are not limited to what has been particularly described hereinabove and other effects not described herein will be more clearly understood by persons skilled in the art from the above description.

The present invention may be implemented as computer-readable code that can be written on a computer-readable medium in which a program is recorded. The computer-readable medium may be any type of recording device in which data that can be read by a computer system is stored. Examples of the computer-readable medium include a Hard Disk Drive (HDD), a Solid State Drive (SSD), a Silicon Disk Drive (SDD), a Read Only Memory (ROM), a Random Access Memory (RAM), a Compact Disc (CD)-ROM, a magnetic tape, a floppy disk, an optical data storage, and a carrier wave (e.g., data transmission over the Internet).

The above detailed description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. An emergency braking system of a vehicle, comprising:
    an imaging device configured to identify a forward obstacle;
    a sensor configured to sense an external environment and a driving state of a vehicle;
    a controller configured to:
        determine a road on which the vehicle is being driven;
        determine a current driving environment case among a plurality of driving environment cases, using the external environment information and the road information;
        learn a braking manipulation tendency of a driver for the current driving environment case, using the obstacle information and the driving state information, wherein the driving state information includes a brake-on point and a brake-off point for the current driving environment case; and
        variably adjust warning and braking intervention timings using the learned braking manipulation tendency according to the driving environment cases.

2. The emergency braking system according to claim 1, wherein the controller is configured to select a learning object zone using the road information and learn the braking manipulation tendency in the selected learning object zone.

3. The emergency braking system according to claim 2, wherein the road information includes at least one selected from the group consisting of: information indicating a road type, information regarding a road class for distinguishing between roads, and information regarding a zone in which a vehicle is frequently driven.

4. The emergency braking system according to claim 1, wherein the obstacle information includes at least one selected from the group consisting of: a distance from the forward obstacle, a relative speed, and a vehicle speed.

5. The emergency braking system according to claim 1, wherein the external environment information includes at least one of external illumination information and rain sensing information.

6. The emergency braking system according to claim 1, wherein the driving state information includes at least one selected from the group consisting of: braking start and end timings based on brake manipulation, deceleration and acceleration during braking, and a steering angle.

7. The emergency braking system according to claim 1, wherein the controller is configured to repeat the learning a predetermined number of times.

8. The emergency braking system according to claim 1, wherein the controller is configured to adjust the warning and braking intervention timings by referring to a lookup table.

9. The emergency braking system according to claim 8, wherein the controller is configured to update the lookup table using the learned braking manipulation tendency.

10. The emergency braking system according to claim 8, wherein the lookup table is prepared with respect to each of the driving environment cases.

11. The method according to claim 1, wherein the driving state information includes at least one selected from the group consisting of: braking start and end timings based on brake manipulation, deceleration and acceleration during braking, and a steering angle.

12. A method of controlling an emergency braking system of a vehicle, comprising:
    receiving, by a controller, external environment information and road information;
    determining, by the controller, a current driving environment case among a plurality of driving environment cases, using the external environment information and the road information;
    receiving, by the controller, forward obstacle information and driving state information;
    learning, by the controller, a braking manipulation tendency of a driver for the current driving environment case, using the received forward obstacle information and driving state information, wherein the driving state information includes a brake-on point and a brake-off point for the current driving environment case; and variably adjusting, by the controller, warning and braking intervention timings using the learned braking manipulation tendency based on the driving environment cases.

13. The method according to claim 12, wherein the learning includes:
   selecting, by the controller, a learning object zone using the road information; and
   learning, by the controller, the braking manipulation tendency in the selected learning object zone.

14. The method according to claim 13, wherein the road information includes at least one selected from the group consisting of: information indicating a road type, information regarding a road class for distinguishing between roads, and information regarding a zone in which a vehicle is frequently driven.

15. The method according to claim 12, wherein the forward obstacle information includes at least one selected from the group consisting of: a distance from a forward obstacle, relative speed, and vehicle speed.

16. The method according to claim 12, wherein the external environment information includes at least one of external illumination information and rain sensing information.

17. The method according to claim 12, wherein the learning includes repeating the learning a predetermined number of times.

18. The method according to claim 12, wherein the adjusting includes updating the lookup table using the learned braking manipulation tendency.

19. The method according to claim 18, wherein the lookup table is prepared with respect to each of the driving environment cases.

20. A non-transitory computer readable medium containing program instructions executed by a controller for controlling the emergency braking system of the vehicle, the computer readable medium comprising:
   program instructions that receive external environment information and road information;
   program instructions that determine a current driving environment case among a plurality of driving environment cases, using the external environment information and the road information;
   program instructions that receive forward obstacle information and driving state information;
   program instructions that learn a braking manipulation tendency of a driver for the current driving environment case, using the received forward obstacle information and driving state information, wherein the driving state information includes a brake-on point and a brake-off point for the current driving environment case; and
   program instructions that variably adjust warning and braking intervention timings using the learned braking manipulation tendency based on the driving environment cases.

\* \* \* \* \*